INVENTOR.
DONALD E. WILLIAMSON
BY
ATTORNEY

Aug. 26, 1952     D. E. WILLIAMSON     2,608,092
DISPLACEMENT INTEGRATOR
Filed Feb. 8, 1946     2 SHEETS—SHEET 2
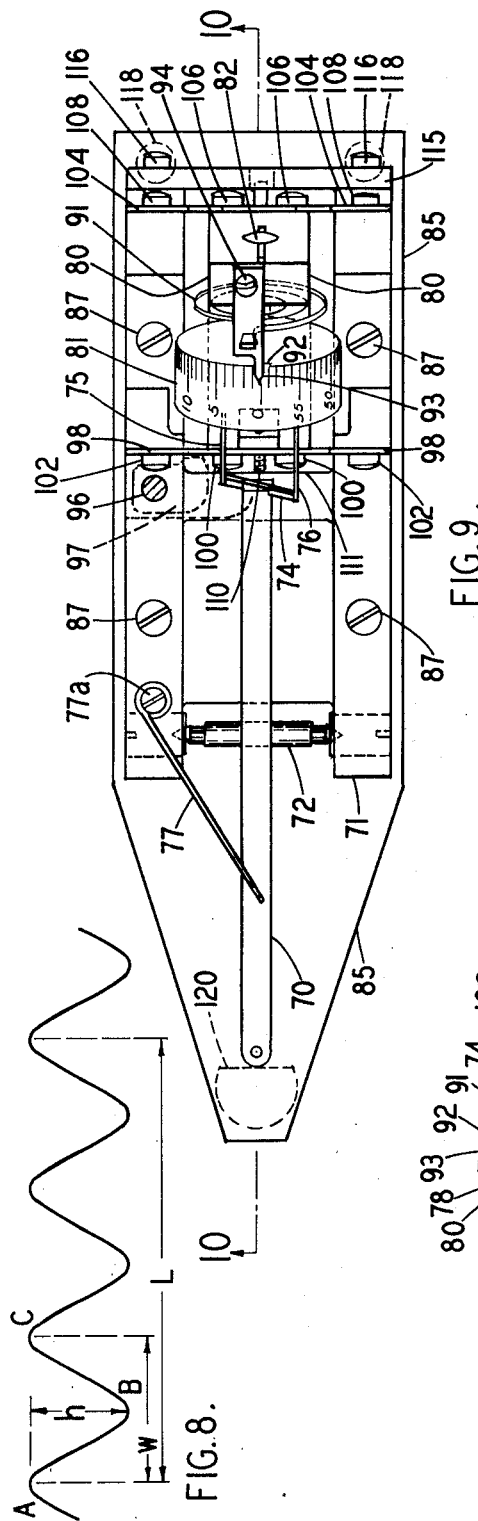
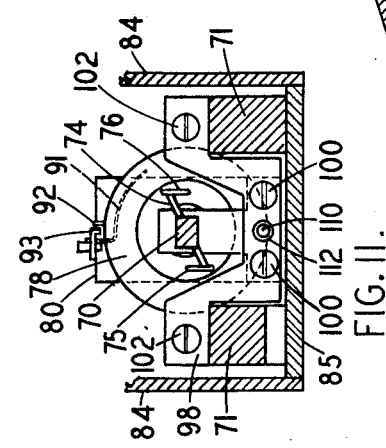
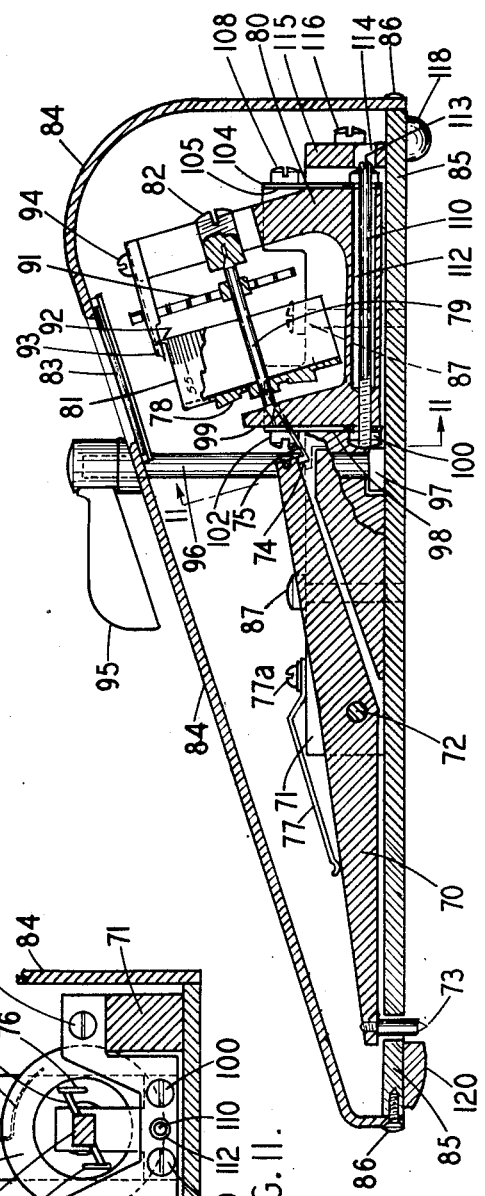
INVENTOR.
DONALD E. WILLIAMSON
BY
Arthur M. Smith
ATTORNEY Patented Aug. 26, 1952

2,608,092

UNITED STATES PATENT OFFICE 2,608,092

DISPLACEMENT INTEGRATOR

Donald E. Williamson, Lincoln Park, Mich., assignor to Lincoln Park Industries, Inc., Lincoln Park, Mich., a corporation of Michigan Application February 8, 1946, Serial No. 646,309

6 Claims. (Cl. 73—105)

1

The present invention relates to improvements in a mechanical displacement intergrator whereby the roughness of a surface or the integration of displacements generated by an oscillating or vibrating body, hereinafter simply termed oscillatory displacements, may be read directly from a movable graduated indicating means.

The control and measurement of surface roughness is of great importance in industrial grinding and polishing operations and in the manufacture of machine parts of all descriptions. Failure to use reliable instruments for evaluating surface roughness and resort to grossly inaccurate visual comparison or fingernail tests have been the frequent cause of incorrect and costly manufacturing procedures. Instruments available for such testing were unsuited to widespread use due to their complexity, size, and cost. The importance of evaluating surface roughness at all stages of production required the development of the reliable instrument of the present invention which can be made readily available for use by machine operators to check the surface roughness characteristics of a work piece or part at any stage of its manufacture.

It is therefore a principal object of the present invention to provide a relatively low cost, accurate, portable roughness measuring instrument which is of compact design and rugged construction, and which can be used by the machine operator to check the surface roughness characteristics of a work piece at any stage of its manufacture.

Another object of the present invention is to provide a surface roughness measuring device which can be adapted to a wide range of surface curvatures and which may be utilized to obtain readings from the surfaces of small holes without the necessity of cutting the piece.

Another object of the present invention is to provide a measuring device which can be applied broadly to the measurement or integration of mechanical oscillatory movements or vibrations. It will be clear from the description to follow that the mechanism may also be readily adapted to provide a high speed counter by controlling the amplitude of motion.

Other objects of this invention will appear in the following description and appended claims, reference being had to the accompanying drawings forming a part of this specification wherein like reference characters designate corresponding parts in the several views.

Fig. 8 is a graph diagram showing a portion of an idealized sinusoidal surface.

Fig. 9 is essentially an enlarged plan view of a surface roughness measuring device embodying the present invention.

Fig. 10 is a sectional view taken substantially along the line 10—10 of Fig. 9, in the direction of the arrows.

Fig. 11 is a breakdown sectional view taken substantially along the line 11—11 of Fig. 10, in the direction of the arrows.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
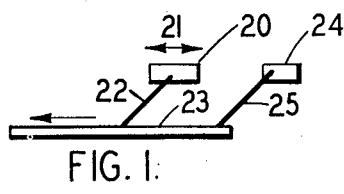
Fig. 1 is a schematic diagram illustrating the friction clutch principle of integration used with the present invention.
Figure 2:
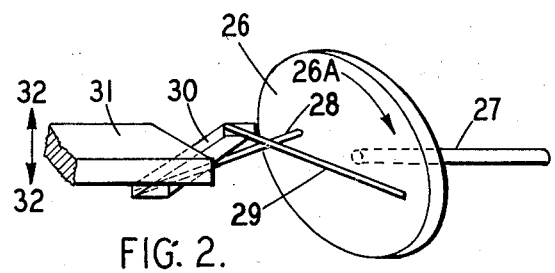
Fig. 2 is an enlarged perspective view illustrating the push-push principle of integration embodied in the present invention.

The principles of operation of a device embodying the present invention will be readily understood by a consideration of Figs. 1 and 2.

In Fig. 1 an oscillating member 20 having a line of motion shown by the arrows 21—21 is attached to a resilient feeler member 22 which makes firm friction contact at an acute angle with a work surface of the movable indicating member 23. As a result of the angle of attack and the friction contact between the feeler 22 and the movable indicating member 23, a one way driving clutch action is achieved. Movement of the oscillator 20 to the left, Fig. 1, increases the friction contact between the feeler 22 and the work surface of the indicating member 23 and is translated to the indicating member 23.

During movement of the oscillator 20 to the right, the friction contact between the feeler 22 and the work surface of the indicating member 23 is decreased. The feeler 22 glides over the work surface of the indicating member 23 which is prevented from movement to the right by a unidirectional brake which may simply be inertia of the member 23, or friction between the member 23 and its supporting means, or a combination of the two. Another example of a suitable unidirectional brake is shown in Fig. 1 where a second feeler 25 is disposed between the stationary member 24 and the member 23 similarly to the disposition of the driving feeler 22. The member 23 may be calibrated or otherwise utilized so that its leftward displacement measures the integration of the total leftward displacements of the oscillator 20.

It is to be noted throughout the description of the present invention that reference to displacement of an indicating member means a relative displacement between the indicating member and its driving means or some part thereof. It is apparent that the present invention will operate if, as in Fig. 1, the indicating member 23 remains stationary while the driving clutch action described above drives the feeler member 22 to the right.

The feeler members 22 and 25 preferably are formed as a filament, the end of which is cut to form the desired angle of contact with the indicating member. The members 22 and 25 may be formed of metal, fibre, glass, or plastic materials.

Fig. 2 shows another form of mechanical integrator operating on a similar principle wherein an indicating disc 26, corresponding in function to the indicating member 23 of Fig. 1, is journaled for free axial rotation with the supporting shaft 27. Two resilient feelers 28 and 29, each similar to the feeler 22 shown in Fig. 1, lie in essentially vertical planes disposed equally distant on either side of the axis of rotation of the disc 26 and contact the work surface of the disc 26 essentially on its horizontal diameter. Each of the feelers 28 and 29 attacks the disc 26 under spring tension and at an angle similarly to the manner in which the feeler 22 attacks the indicating member 23 of Fig. 1. However feeler 28 approaches the disc 26 from below and feeler 29 approaches the disc 26 from above the horizontal diameter of the disc 26.

The fixed ends of the feeler 28 and 29 are attached to the opposite ends of an inclined cross bar 30 attached to the beam 31 which is adapted for oscillatory or vibratory motion essentially in the direction of the arrows 32—32 which are perpendicular to both the axis of rotation and the horizontal diameter of the disc 26. Movement of the oscillating beam 31 is imparted to the feelers 28 and 29 causing them to move both above and below the horizontal diameter described and thereby rotate the rotatable disc 26 by a driving clutch effect. On the upstroke of the beam 31, the feeler 28 rotates the disc 26 in the direction of the arrow 26A, and feeler 29 drags lightly over the work surface of the disc 26. On the downstroke of the member 31, the feeler 29 rotates the disc 26 also in the direction of the arrow 26A while the feeler 28 drags lightly over the work surface of the disc 26.

Thus the total rotation of the indicating disc 26 is a direct function of an integration of the oscillatory displacements of the member 31. Since the rotation of the disc 26 due to each feeler 28 and 29 is cumulative, the push-push action described provides double the rotational effect of a single feeler. Also, since one of the feelers 28 or 29 is driving the disc 26 while the other feeler is dragging lightly over the work surface of the disc 26, backward rotation of the indicating disc 26 is prevented at all times.

Dimensions of the parts with relation to the oscillatory motion to be integrated are chosen so that the circular motion of the disc 26 at the point of feeler contact is such a short arc that it can be considered to be essentially a straight line. Thus the angular movement of the disc 26 is essentially proportional to the movement of the oscillator 31. However, it has been found that the choice of dimensions may be varied widely without affecting the operation or accuracy of the device.

Figure 3:
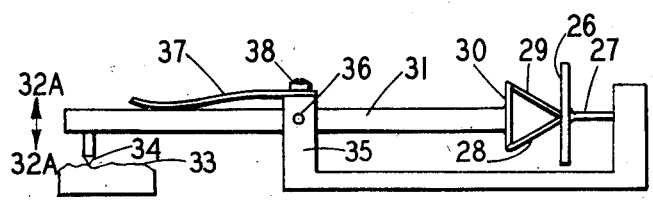
Fig. 3 is a side elevation of a device adapting the principle illustrated by Fig. 2 to the measurement of surface roughness or waviness.

Fig. 3 shows in side elevation how the principle of the mechanical integrator of Fig. 2 may be adapted to measure surface roughness or waviness. A surface 33 of a specimen to be tested is placed in contact with the tracer point 34, which is rigidly secured to and moveable with one end of the beam 31 in a direction essentially normal to the surface 33 by virtue of the pivot attachment 36 of the beam 31 to the frame 35. When the tracer point 34 is caused to trace a path over the surface 33, an essentially vertical oscillation in the direction of the arrows 32A—32A is imparted to the point 34 in direct relation to the vertical dimensions of the irregularities of the surface 33. It has been found that a diamond tracer point 34 ending in a spherical radius of from approximately .0005″ to approximately .00005″ is satisfactory, as such a point will reach the bottom of practically all irregularities in a surface to be measured for roughness by a device embodying the present invention.

The tracer point 34 is rigidly attached to the beam 31 which is joined to the frame 35 by the pivot 36. A light spring arm 37 attached to the frame 35 by the fastening device 38 presses on the beam 31 with sufficient force to maintain the tracer point 34 in contact with the surface 33 at ordinary speeds of motion between the point 34 and the surface 33, but without scratching said surface 33. In this connection it is desirable to construct the beam 31 and all parts rigidly attached to it of light material.

The opposite end of the beam 31 is seen to be the oscillatory member 31, Fig. 2, which imparts its motion to the cross bar 30 and feelers 28 and 29. The supporting shaft 27 for the indicating disc 26 is secured to the frame 35. From the foregoing, it will be seen that horizontal movement of the specimen surface 33 a unit distance with respect to the tracer point 34 causes the point 34 to move under spring tension up and down with the hills and valleys of the surface 33. The oscillatory motion of the tracer point 34 will be a measure of the roughness of the surface 33 and is transmitted through the beam 31 to the feelers 28 and 29. By means of the driving clutch action between said feelers 28 and 29 and the surface of the disc 26, each increment of vertical motion of the feelers 28 and 29 imparts to the disc 26 a corresponding increment of rotation such that the total rotation of the disc 26 is a measure of the unevenness or roughness of the surface 33 of the specimen tested.

The position of the pivot 36 with respect to the tracer point 34 and the tips of the feelers 28 and 29 determines the ratio between the motion of the tracer point and the motion of the feeler tips. Whereas in Fig. 3 the pivot 36 is placed near the midpoint of the beam 31, it may be located anywhere between the ends of the beam 31 which may be extended to the left of the tracer point or to the right of the feeler tips.

A more complete understanding of the function of the disc as an integrator or as a high speed counter, will be gained by assuming an idealized specimen surface having the sinusoidal cross section shown enlarged in Fig. 8. The double amplitude is $h$, the distance between waves is $w$, and the total distance covered by the tracer point is L. The total number of waves which the tracer covers in the distance L is $L/w$ or $n$. As the tracer point moves along the curve from A to B, it will move downward a distance $h$ and cause an increment of rotation of the disc 26 corresponding to the magnitude of $h$. As the tracer point moves along the curve from B to C it will likewise add another increment of rotation of the same magnitude as the first. Thus in tracing one complete wave length, two incremental rotations of the indicating disc are produced, each directly related to the depth of the valley $h$. In traversing the $n$ waves in the distance L, $2n$ incremental rotations will be produced, each directly related to $h$. The total angle of rotation of the indicating disc 26 will be directly related to $2nh$. Where L is a known or standardized value, the roughness or waviness of one surface may be compared with another.

It is also evident from the above discussion that $n$ is a coefficient of $h$. Hence if the double amplitude $h$ of vibration is known or held constant, the device will serve as a high speed counter to determine the number of vibrations $n$ occurring within a definite time period.

Figure 4:
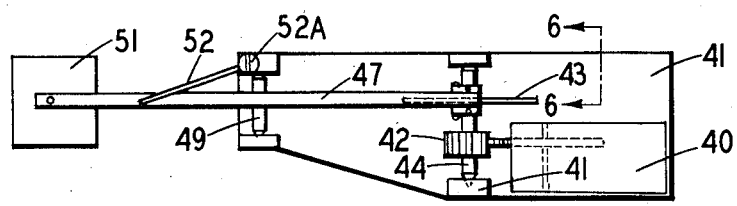
Fig. 4 is a plan view of an embodiment of the present invention using a friction brake principle of integration.
Figure 5:
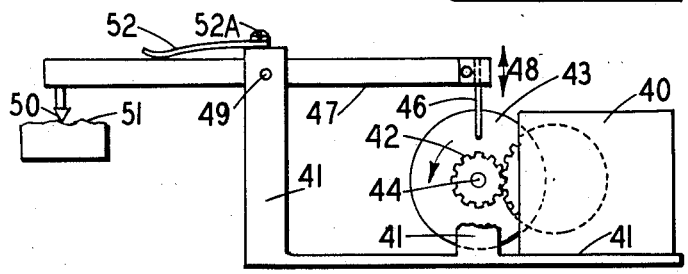
Fig. 5 is a side elevation of the device shown in Fig. 4.
Figure 6:
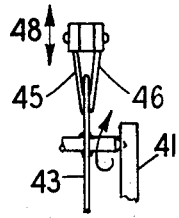
Fig. 6 is a fragmentary sectional view taken in the direction of the arrows along the line 6—6 of Fig. 4.

Figs. 4, 5, and 6 apply to a variation of design in which the power for turning the indicating disc is furnished partly or wholly by means other than the pushing action of the feelers. A clockwork or other torque producing device 40 is mounted on the frame 41 and drives the gear 42 which is secured coaxially with the vertical disc 43 by means of the horizontal axle shaft 44 journaled to the frame 41. Resilient feelers 45 and 46, pressing on opposite sides of the disc 43 and acting as friction brakes, are attached at their upper ends to the essentially horizontal beam 47 having its longitudinal axis in the plane of the disc 43.

In manner of action and by construction similar to the embodiment shown in Fig. 3, the feelers 45 and 46 are actuated in the essentially radial motion indicated by the arrows 48—48 upon movement of the beam 47 about its pivot connection 49 with the frame 41. The tracer point 50 is held to the surface of the specimen 51 by action of the light spring 52 which is attached to the frame 41 by the screw 52A.

Referring to Fig. 6, the feelers 45 and 46 are seen to press against the opposed faces of the disc 43 with sufficient frictional contact to prevent rotation of the disc 43 when the feelers are at rest. During a given displacement of the feelers 45 and 46 radially with respect to the disc 43, the resultant of forces acting on the disc 43 causes the disc 43 to rotate as a function of the torque of the driving mechanism 40 and of the friction between the feelers 45 and 46 and the disc 43. The total rotation of the disc 43 or some connected part of the driving mechanism 40 thus becomes a measure of the surface roughness or waviness of the specimen 51.

Figure 7:
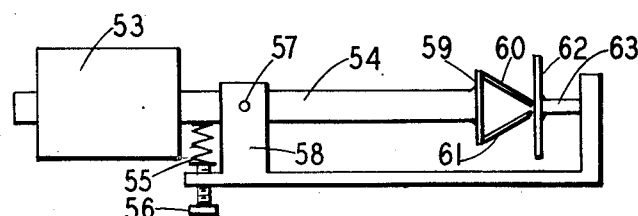
Fig. 7 is a side elevation of a device using the push-push principle of integration adapted to a seismic type of vibration indicator.

Fig. 7 shows a seismic type vibration indicator using the feeler arrangement described in connection with Figs. 2 and 3, although the friction brake type of feeler arrangement shown in Figs. 4, 5, and 6 also may be used. A seismic mass 53 is attached to one end of the beam 54 and is supported by the spring 55 which is adjustable by means of the thumb screw 56 threaded through the frame 58. The beam 54 is supported by the pivot 57 in the frame 58. In operation and construction, the cross bar 59, feelers 60 and 61, indicating disc 62, and supporting shaft 63 journaled to the frame 58 are similar to their corresponding parts described in connection with Figs. 2 and 3.

In the measurement of vibration, the frame 58 is mounted on or against the vibrating body. By virtue of the inertia of mass 53 which causes the beam 54 to oscillate about the pivot 57, the indicating disc 62 is rotated in a given time as a function of said vibration. A timing device such as a stop watch may be separate from or incorporated into the instrument to record the time factor.

As a variation of design, the mass 53 may be eliminated by connecting one end of the beam 54 directly to the vibrating body and mounting the frame 58 on a relatively stationary body. The vibration indicated will then be the relative vibration of the two bodies.

Uniform pressure of the feelers against the indicating disc is maintained for all reasonable positions of the beam in the type of construction shown in Figs. 2, 3, 7, 9, 10 and 11 by giving to the work surface of the indicating disc a spherical curvature centered at the intersection of the axis of rotation of the disc and the pivot axis of the beam. However it is not the purpose of this invention to limit the construction to a crossarm and feeler assembly attached to a pivoted beam. Any means which will mount the feeler assembly in its proper position relative to the indicating means and allow a suitable transfer of motion to the feelers may be used. For other arrangements of the parts, suitable shapes for the surface of the indicating means will be determined by the type of indication desired and the type of means used to hold the feelers. The work surface of the indicating means against which the feelers operate must be prepared with consideration to the shape of the feelers, the magnitude of the motion desired to be detected, and the frictional properties of the material from which the feelers are formed. For the measurement of roughness, it has been found that an indicating surface having a fine-grained roughness produces the best results using nylon or vegetable fibre for the material from which the filaments forming the feelers are made. The work surface can be prepared by a fine grit-blast or by lapping. The latter method is preferred if the work surface is to be spherical, as the position of the lapping wheel against the disc can be adjusted to generate a sphere of the proper radius. By proper adjustment of the rotational speed of the disc and the lap, the abrasive marks on the disc can be made essentially radial and consequently essentially perpendicular to the direction of motion of the feelers. This fine-grained roughness provides some "grip" for the feeler tips to prevent slipping.

Reference to the roughness of the work surface of the indicating member does not mean that the present invention depends upon the customary concept of a ratch-ratchet relationship between the indicator member and feeler member wherein a minimum increment of movement of the indicating member is required before the feeler can engage the next succeeding tooth. For some purposes, as for the integration of relatively large oscillatory motions, a fine ratch-ratchet operation between feeler and indicating member may be desirable and is perfectly suited for use with the present invention. However, a friction clutch type engagement between the indicating member and feeler member may also be utilized with the present invention and is preferable for the integration of relatively small oscillatory displacements. Thus the feeler member makes non-slip friction contact at any desired point of contact with the indicating disc; and the fine-grained roughness sometimes desirable on the feeler contacting surface of the indicating disc is merely to increase the degree of frictional contact. Consequently there is no interval on the surface of the indicating disc where the feeler member cannot make firm non-slip friction contact to drive said indicating disc.

With certain types of feelers, such as those in which a spring steel filament is employed, the tip may present a sharpened surface to the disc, and press into the metal of the disc slightly but not enough to exceed its yield point. In this instance, the contact area on the disc should be as smooth as possible.

Figs. 9, 10, and 11 show a convenient embodiment of the present invention using the push-push principle of integration as described in connection with Figs. 2 and 3. The beam 70 is pivotally connected to the frame 71 by the pivot 72. The beam 70 is attached at one end to the tracer point 73, and at the other end to the cross bar 74 to which are attached the feelers 75 and 76. The spring 77 is attached to the frame 71 by the screw 77A and holds the tracer point 73 in contact with the surface under test. These parts all function and are assembled essentially as previously described in connection with Figs. 3 and 4.

The face of the indicating disc 78 is preferably spherical to maintain constant pressure against the feeler tips as they oscillate in an arc about the pivot 72 of the beam 70. The journal shaft 79 of the disc 78 is journaled at an inclination from the horizontal to the carriage frame 80 to allow intersection of the axis of the shaft 79 and the pivot axis 72. Pressure against the bearing surface of the journal shaft 79 is regulated by the adjustable bearing screw 82. The graduated scale 81 on the disc 78 is read through the transparent window 83 secured above said scale 81 to the underside of the protecting cover 84 which in turn is fastened to the horizontal base piece 85 by a plurality of screws 86. The frame 71 is also secured to the base 85 by a plurality of bolts 87.

The scale 81 is held at its starting position of zero reading by action of the spiral spring 91 which presses the small projection or stop 92 against the stationary pointer 93. The stop 92 is attached to the rear of the scale 81 just behind the zero reading. The spiral spring 91 is attached at one end to the frame of the pointer 93 which is secured to the carriage 80 by the screws 94. The other end of the spring 91 is attached to the journal shaft 79 which is coaxially secured to and rotatable with the indicating disc 78 and graduated scale 81, all of which rotate against the action of the spring 91 by means of the driving action of the feeler members 75 and 76 on the surface of the indicating disc 78.

When action of the feelers 75 and 76 has rotated the disc 78, it may be returned to its original zero position by means of the zero set lever 95 secured to the shaft 96 which extends from above the cover 84 vertically downward and is journaled in the frame 71. The cam 97, secured to the shaft 96 near its base, lies adjacent to the face of the sheet spring member 98 which extends in a vertical plane across the forward vertical face 99 of the carriage 80, secured thereto as by the two bolts 100, and secured to the frame 71 as by the two bolts 102. A second sheet spring member 104 lies adjacent the rear vertical face 105 of the carriage 80, secured thereto as by the two bolts 106, and secured to the frame 71 as by the two bolts 108. The carriage 80 is thus cradled between two sheet spring members 98 and 104 and is otherwise free from contact with the base 85 or frame 71. By means of the zero set lever 95 and the shaft 96, the cam 97 is caused to press against the spring 98 and move the carriage slightly rearward. Since the indicating disc 78 is journaled on the carriage 80 and moveable therewith, the retraction of the carriage 80 frees the surface of the indicating disc 78 from contact with the feelers 75 and 76 with the result that the extended spiral spring 91 brings the stop 92 in contact with the stationary pointer 93 and the scale 81 again reads zero.

The elongated blunt-nosed adjusting screw 110 threads through the forward wall on the midline near the base of the carriage 80 to extend ahead of the carriage 80 and abut the vertical pad 111 of the frame 71, and also extends rearward and horizontally along the midline of the carriage 80 through the longitudinal opening 112 provided in the carriage 80 for said screw 110. The slotted portion 113 of the screw 110 protrudes partially into the opening 114 of the backbrace 115 which extends across the back of the frame 71 and is joined thereto by the bolts 116. Upon removing the cover piece 84, a screwdriver may be inserted into the opening 114 to turn the adjusting screw 110 and move the carriage forward or backward and thereby adjust the friction contact between the tips of the resilient feelers 75 and 76 and the indicating disc 78. Likewise, adjustment of the screw 110 maintains tension on the sheet springs 98 and 104 which firmly holds the carriage 80 in place.

In operation, the device shown in Figs. 9, 10 and 11 glides over the surface to be tested on the two polished gliders 118 secured to the bottom of the base 85 at the rear of the device and the third glider 120 secured to the bottom of the base 85 at its apex. The tracer point 73 follows the contours of the surface being tested and activates the feelers 75 and 76 through the pivoted beam 70. The feelers rotate the indicating disc 78 according to their oscillatory displacements which in turn are a function of the roughness of the surface under test. The rotational displacement of the disc 78 is read directly from the graduated scale 81, which reading, taken for a unit length of trace, is the measure of the roughness of the surface over which the trace was made.

In addition to the embodiments of the present invention described in detail above, the invention is readily useful in many other forms. For example, the gliders 118 may be extended to adapt the invention for the testing of outside cylindrical surfaces. It also is feasible to narrow the forward portion of the instrument to probe into and test the surface roughness inside small openings

I claim:

1. A device for integrating small oscillatory mechanical displacements and comprising a beam pivotally mounted on a base, means for imparting pivotal oscillations to said beam in response to the oscillatory displacements to be integrated, a rotatable integrating and indicating member journaled to a supporting frame and having a concave work surface formed from a sphere centered at the intersection of the axis of rotation of said rotatable disc and the pivot axis of said beam, a pair of feeler members, each attached to said beam and extending therefrom to make unidirectional friction driving contact with the work surface of said rotatable disc, each feeler member of said pair contacting said rotatable disc on a side of the axis of rotation of said disc essentially diametrically opposed to the other feeler member, the one feeler member being engaged to rotate said rotatable disc on each forward oscillation of said oscillator, the second feeler member being engaged to rotate said rotatable disc on each return oscillation of said oscillator and in the same direction of rotation as produced by the forward movement of the first feeler member.

2. In a device for measuring the roughness of a surface, the combination of an oscillator, a base for supporting said oscillator, an exploratory surface contacting member attached to said oscillator and adapted to follow the contours of a surface and translate the vertical variations thereof into oscillations of said oscillator, a driving feeler member attached at one end to said oscillator to oscillate therewith, a moveable indicating member in friction contact with and driven by the other end of said feeler member on each forward oscillation of said driving feeler member, and a unidirectional brake applied to prevent the return movement of said indicating member on each return oscillation of said driving feeler member.

3. In a device for measuring the roughness of a surface, the combination of an oscillator, an exploratory surface contacting member attached to said oscillator and adapted to follow the contours of a surface and translate the vertical variations thereof into oscillations of said oscillator, a rotatable indicating disc journaled to a frame, and a pair of elongated driving filaments, each filament attached at one end to said oscillator to oscillate therewith and extending therefrom to meet at an acute angle and to make unidirectional friction driving contact with a work surface of said rotatable indicating disc, each filament contacting said work surface on a side of the axis of rotation of said rotatable disc essentially diametrically opposed to the other filament, the one filament of the pair engaged by virtue of its angle of contact with the work surface of said rotatable indicating disc to increase the pressure and friction engagement at said work surface to rotate said rotatable indicating disc on each forward oscillation and to decrease the pressure and friction engagement at said work surface to allow said filament to move lightly over said work surface on the return oscillation, the second filament engaged by virtue of its angle of contact with the work surface of said rotatable indicating disc to increase the pressure and friction engagement at said work surface to rotate said rotatable indicating disc on the return oscillation and in the same direction of rotation as produced by the forward oscillation of the first filament and to decrease the pressure and friction engagement at said work surface to allow said second filament to move lightly over the surface of said rotatable disc on the forward oscillation.

4. A device for integrating oscillatory mechanical displacements and comprising a beam pivotally mounted on a base, and exploratory surface contacting member attached to said oscillator and adapted to follow the contours of a surface and translate the vertical variations thereof into pivotal oscillations of said beam, a rotatable indicating disc journaled to a supporting frame and having a concave work surface formed from a sphere centered at the intersection of the axis of rotation of said rotatable disc and the pivot axis of said beam, and a pair of elongated driving filaments, each filament being attached to said oscillator to oscillate therewith and extended therefrom to meet at an acute angle and to make unidirectional friction driving contact with a work surface of said rotatable indicating disc, each filament contacting said work surface on a side of the axis of rotation of said rotatable disc essentially diametrically opposed to the other filament, the one filament of the pair being engaged by virtue of its angle of contact with the work surface of said rotatable indicating disc to increase the pressure and friction engagement at said work surface to rotate said rotatable indicating disc on each forward oscillation and to decrease the pressure and friction engagement at said work surface to allow said filament to move lightly over said work surface on the return oscillation, the second filament being engaged by virtue of its angle of contact with the work surface of said rotatable indicating disc to increase the pressure and friction engagement at said work surface to rotate said rotatable indicating disc on the return oscillation and in the same direction of rotation as produced by forward oscillation of the first filament and to decrease the pressure and friction engagement at said work surface to allow said second filament to move lightly over the surface of said rotatable disc on the forward oscillation.

5. In a measuring device for measuring the roughness of a surface, the combination of a base having a plurality of laterally and longitudinally spaced glider portions for gliding over the surface to be measured, said glider portions each having a surface area sufficient to prevent movement of said base perpendicular to said surface in response to surface irregularities therein, a beam pivotally supported on said base, a tracer point on said beam adapted to engage the surface and follow the contours of the surface while gliding said base over the surface and to transmit the surface irregularities or vertical variations thereof into oscillations of said beam, and means to integrate the oscillations of said beam including a pair of friction filament members secured to said beam for oscillation therewith, and a rotatable disc mounted for rotary movement on said base, said rotatable disc having a concave work surface formed from a sphere centered at the intersection of the axis of rotation of said rotatable disc and the pivot axis of said beam, said filament members frictionally engaging said rotatable disc and controlling the rotation thereof in response to oscillations of said beam.

6. In a device for measuring the roughness of a surface, the combination of an oscillator, a base for supporting said oscillator, an exploratory surface contacting member attached to said oscillator and adapted to follow the contours of a surface and translate the vertical variations thereof into oscillations of said oscillator, an integrating and indicating member rotatably mounted adjacent said oscillator, a pair of feeler members each attached to said oscillator and extending therefrom to make unidirectional friction driving contact with said integrating and indicating member, each feeler member contacting said integrating and indicating member on a side of the axis of rotation essentially diametrically opposed to the other feeler member, the one feeler member being engaged to rotate said integrating and indicating member on each forward oscillation of said oscillator, the other feeler member being engaged to rotate said integrating and indicating member on each return oscillation of said oscillator and in the same direction of rotation as produced by the forward movement of the first named feeler member.

DONALD E. WILLIAMSON.

REFERENCES CITED

The following references are of record in the file of this patent:

UNITED STATES PATENTS

| Number | Name | Date |
|---|---|---|
| 438,208 | Wallace | Oct. 14, 1890 |
| 773,983 | Reisner | Nov. 1, 1904 |
| 1,042,525 | Benoist | Oct. 29, 1912 |
| 1,403,182 | Maturin | Jan. 10, 1922 |
| 1,600,099 | Burstyn | Sept. 14, 1926 |
| 1,816,102 | Waters et al. | July 28, 1931 |
| 2,240,536 | Woxen | May 6, 1941 |
| 2,274,875 | Thompson | Mar. 3, 1942 |
| 2,328,967 | Donnell et al. | Sept. 7, 1943 |
| 2,344,217 | Reason et al. | May 14, 1944 |
| 2,354,605 | Norman | July 25, 1944 |
| 2,474,015 | Shaw | June 21, 1949 |

FOREIGN PATENTS

| Number | Country | Date |
|---|---|---|
| 362,897 | Great Britain | Dec. 4, 1931 |

OTHER REFERENCES

"Lindau's Tatsalicher und Gemessener Feinheitgrad geschliffener Flachen," 1934, pages 9, 10, and 11. Photostat copy in Division 36, class 73–105.